(12) United States Patent
Lupke et al.

(10) Patent No.: US 11,052,593 B2
(45) Date of Patent: Jul. 6, 2021

(54) DIE HEAD AND DIE TOOLING SPIDER WITH SPIDER LEGS HAVING CURVED FLOW GUIDES

(71) Applicants: Manfred A. A. Lupke, Thornhill (CA); Stefan A. Lupke, Thornhill (CA)

(72) Inventors: Manfred A. A. Lupke, Thornhill (CA); Stefan A. Lupke, Thornhill (CA)

(*) Notice: Subject to any disclaimer, the term of this patent is extended or adjusted under 35 U.S.C. 154(b) by 0 days.

(21) Appl. No.: 17/006,382

(22) Filed: Aug. 28, 2020

(65) Prior Publication Data

US 2020/0391426 A1    Dec. 17, 2020

Related U.S. Application Data

(63) Continuation of application No. PCT/CA2019/000027, filed on Feb. 27, 2019.

(60) Provisional application No. 62/636,805, filed on Feb. 28, 2018.

(51) Int. Cl.
| | |
|---|---|
| *B29C 48/70* | (2019.01) |
| *B29C 48/32* | (2019.01) |
| *B29C 48/09* | (2019.01) |
| *B29C 48/335* | (2019.01) |
| *B29C 48/11* | (2019.01) |

(52) U.S. Cl.
CPC .......... *B29C 48/3366* (2019.02); *B29C 48/09* (2019.02); *B29C 48/11* (2019.02); *B29C 48/32* (2019.02); *B29C 48/705* (2019.02)

(58) Field of Classification Search
CPC ..... B29C 48/0016; B29C 48/09; B29C 48/11; B29C 48/21; B29C 48/32; B29C 48/335; B29C 48/3366; B29C 48/705
See application file for complete search history.

(56) References Cited

U.S. PATENT DOCUMENTS

| | | | | |
|---|---|---|---|---|
| 2,363,261 | A | * 11/1944 | Ritter | B28B 21/54 425/168 |
| 2,817,113 | A | * 12/1957 | Fields | B29C 48/32 425/380 |
| 4,305,703 | A |   12/1981 | Lupke et al. | |
| 4,846,658 | A |    7/1989 | McMullen | |
| 6,056,528 | A | *  5/2000 | Lupke | B29C 48/11 425/133.1 |

OTHER PUBLICATIONS

Zhang,P.; International Search Report from corresponding PCT Application No. PCT/CA2019/000027; search completed May 21, 2019.

* cited by examiner

*Primary Examiner* — Xiao S Zhao
*Assistant Examiner* — Joseph S Leyson
(74) *Attorney, Agent, or Firm* — Cahn & Samuels, LLP

(57) ABSTRACT

The present invention provides a spider for a die head and die tooling that utilizes curved flow guides to direct the flow of plastic through the die head and die tooling. The spider leg splits the stream of plastic flowing through the spider into two independent streams at the upstream end. The downstream end comprises two curved flow guides that are configured to direct the two streams of plastic towards a longitudinal center plane of the spider leg. The turbulence caused by the curved flow guides creates obtuse or acute angled welding lines between the two streams of plastic. These obtuse and acute angled welding lines provide stronger bonds than the known spider legs that create butt welding or right angled welding lines.

14 Claims, 16 Drawing Sheets

DIE HEAD AND DIE TOOLING SPIDER WITH SPIDER LEGS HAVING CURVED FLOW GUIDES

CROSS-REFERENCE TO RELATED APPLICATIONS

The present application is a continuation of PCT Application No. PCT/CA2019/000027 filed on Feb. 27, 2019, which claims priority from U.S. Provisional Application No. 62/636,805 filed on Feb. 28, 2018, both incorporated herein by reference in their entireties.

TECHNICAL FIELD

The present invention relates to plastic extrusion for producing double wall plastic pipes. Specifically, the present invention relates to a die head and die tooling spider with spider legs.

BACKGROUND

A conventional mandrel of a die head and die tooling used in extruding double wall plastic pipe is made of a plurality of concentric mandrel tubes that are centered and stabilized relative to one another through the use of a device known in the industry as a "spider". The spider provides a spacer to allow the flow of plastic along the tubes past the spider. The spider has a plurality of internal plastic flow passages extended axially and "spider legs" (supports) between each flow passage.

In the prior art, as shown in FIGS. 1A to 1E, the spider legs have an upstream part and a downstream part at opposite ends. The upstream part splits a flow of plastic (stream A) into independent plastic streams that flow around the spider leg and reunite at the downstream end of the spider as streams E1 and E2. The shape and configuration of the spider legs affects the welding lines created between streams E1 and E2.

FIG. 1A shows prior art spider legs with a downstream part that does not have split legs staggered or offset from each other. FIGS. 1B to 1D show prior art spider legs with a downstream part that has two staggered or offset legs that increase the turbulence and disruption to the plastic streams. However, the prior art spider legs shown in FIGS. 1B to 1D direct the plastic streams through straight channels (shown in FIG. 1D).

The straight channels shown in FIG. 1D direct the streams of plastic to meet and be pressed together, resulting in a right-angled welding bond (shown in FIG. 1E). The wall thickness of the pipe is thinner along the weld lines and thicker in the regions between the weld lines. There is however a need in the field for stronger bonds at these weld lines.

SUMMARY

The present invention as detailed in this document is advantageous over known spider legs in that the spider legs of the present invention produce non-right-angled bonds in the weld lines of the double wall plastic pipe. These spider legs provide bonds with acute or obtuse angles that tend to be stronger and more secure than right-angled bonds.

In a first aspect, the present invention provides a spider for a die head and die tooling, wherein said spider comprises: a plurality of internal plastic flow passages extending axially through said spider; and a spider leg between each of said plurality of internal plastic flow passages, wherein said spider leg comprises: an upstream portion; a center portion; and a downstream portion; wherein said upstream portion has a front apex for dividing a stream of plastic in said die head and die tooling into a first stream on a first side of said spider leg and a second stream on a second side of said spider leg; wherein said downstream portion further comprises an upper curved flow guide and a lower curved flow guide; and wherein said upper curved flow guide and said lower curved flow guide direct said first stream and said second stream towards each other to bond with one another after flowing around said spider leg.

In a second aspect, the present invention provides a spider leg for use in a spider in a die head and die tooling, said spider leg comprises: an upstream portion; a center portion; and a downstream portion; wherein said upstream portion has a front apex for dividing a stream of plastic in said die head and die tooling into a first stream and a second stream; wherein said center portion separates said upstream portion from said downstream portion; wherein said downstream portion further comprises an upper leg portion and a lower leg portion staggered at different radial depths from each other, said upper leg portion having an upper curved flow guide and said lower leg portion having a lower curved flow guide; wherein said lower curved flow guide directs at least a portion of said first stream towards a vertical plane along a longitudinal axis of the spider leg and said upper curved flow guide directs at least a portion of said second stream towards said vertical plane; wherein said at least a portion of said first stream and said at least a portion of said second stream are directed towards each other to bond with one another after flowing around said spider leg.

In a third aspect, the present invention provides a spider for a die head and die tooling, wherein said spider comprises: a plurality of internal plastic flow passages extending axially through said spider; and a spider leg between each of said plurality of internal plastic flow passages; wherein said spider leg comprises: a front apex; a first leg and a second leg coupled to said front apex, each of said first leg and said second leg being angled away from each other and each of said first leg and said second leg being angled away from a vertical plane along a longitudinal axis of said spider leg; wherein a flow of plastic is divided into a first flow, a second flow, a third flow and a fourth flow by said front apex, said first flow flowing along a first side of said first leg, said second flow flowing along a second side of said first leg, said third flow flowing along a first side of said second leg and said fourth flow flowing along a second side of said second leg; wherein the first flow and the third flow are adjacent to one another and said first flow and said third flow are directed by said spider leg to flow towards each other; wherein said second flow is directed to flow away from said second leg and said fourth flow is directed to flow away from said first leg; wherein a portion of the first side of the first leg is distal to the front apex and said portion of the first side of the first leg slants towards the second leg; and wherein a portion of the first side of the second leg is distal to the front apex and said portion of the first side of the second leg slants towards the first leg.

In a fourth aspect, the present invention provides a spider leg for use in a spider, wherein said spider leg comprises: a front apex; a first leg and a second leg coupled to said front apex, each of said first leg and said second leg being angled away from each other and each of said first leg and said second leg being angled away from a vertical plane along a longitudinal axis of said spider leg; wherein a flow of plastic is divided into a first flow, a second flow, a third flow and a fourth flow by said front apex, said first flow flowing along a first side of said first leg, said second flow flowing along a second side of said first leg, said third flow flowing along a first side of said second leg and said fourth flow flowing along a second side of said second leg; wherein the first flow and the third flow are adjacent to one another and said first flow and said third flow are directed by said spider leg to flow towards each other; wherein said second flow is directed to flow away from said second leg and said fourth flow is directed to flow away from said first leg; wherein a portion of the first side of the first leg is distal to the front apex and said portion of the first side of the first leg slants towards the second leg; and wherein a portion of the first side of the second leg is distal to the front apex and said portion of the first side of the second leg slants towards the first leg.

BRIEF DESCRIPTION OF THE DRAWINGS

The present invention will now be described by reference to the following figures, in which identical reference numerals refer to identical elements and in which.

DETAILED DESCRIPTION

Figure 1A:
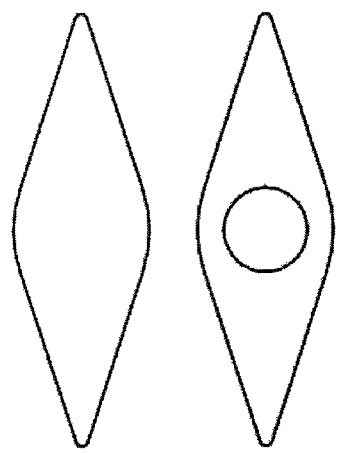
FIG. 1A shows a top view of a prior art spider leg.
Figure 1B:
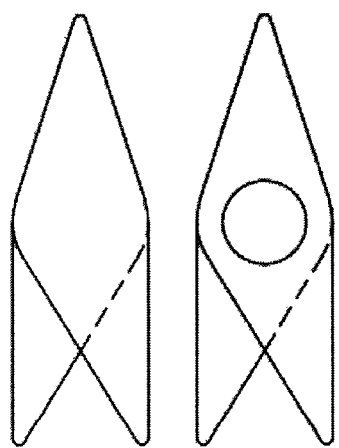
FIG. 1B shows a top view of another prior art spider leg.
Figure 1C:
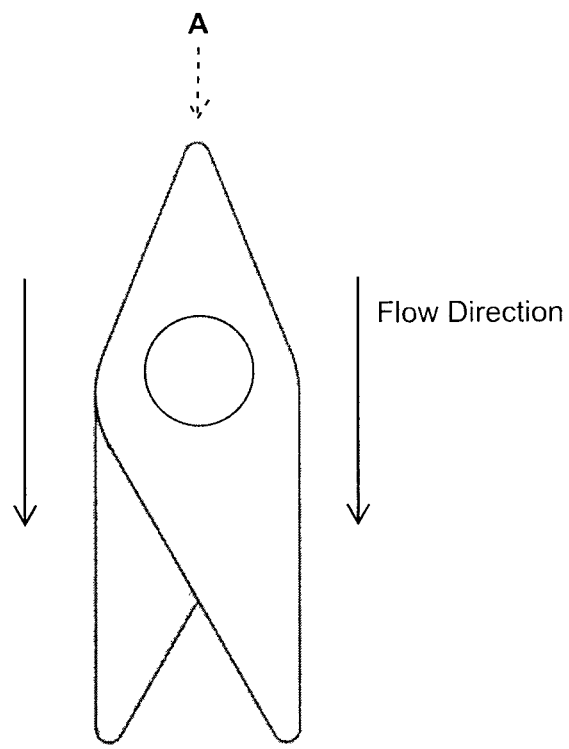
FIG. 1C shows a top view of the prior art spider leg shown in FIG. 1B, with the direction of the flow of plastic in the extrusion process.
Figure 1D:
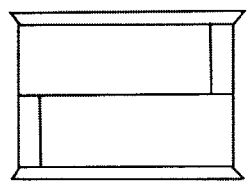
FIG. 1D shows a downstream view of the prior art spider leg shown in FIGS. 1B and 1C.
Figure 1E:
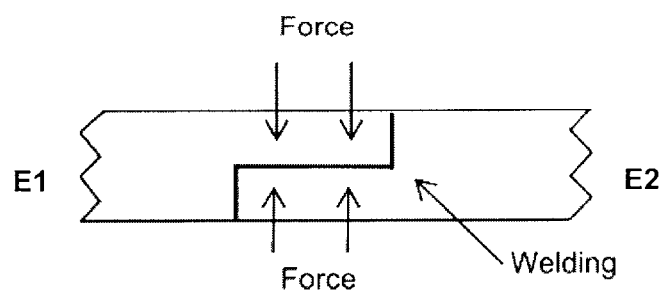
FIG. 1E shows the weld lines that result from the prior art spider leg shown in FIGS. 1B to 1D.

As described above, FIGS. 1B and 1A show prior art spider legs with and without staggered or offset legs in the downstream part, respectively. FIG. 1C shows the direction of the flow of plastic in the extrusion process with the prior art spider leg shown in FIG. 1B. FIG. 1D shows a downstream view of the prior art spider leg shown in FIG. 1B. The prior art spider leg has angular flow guides with straight channels. Specifically, FIG. 1D shows the downstream end of the spider leg with right angle flow guides. FIG. 1E shows the right-angle welding lines of the plastic after the split independent streams of plastic have converged as the final streams E1 and E2 at the downstream end of the spider leg.

Figure 2:
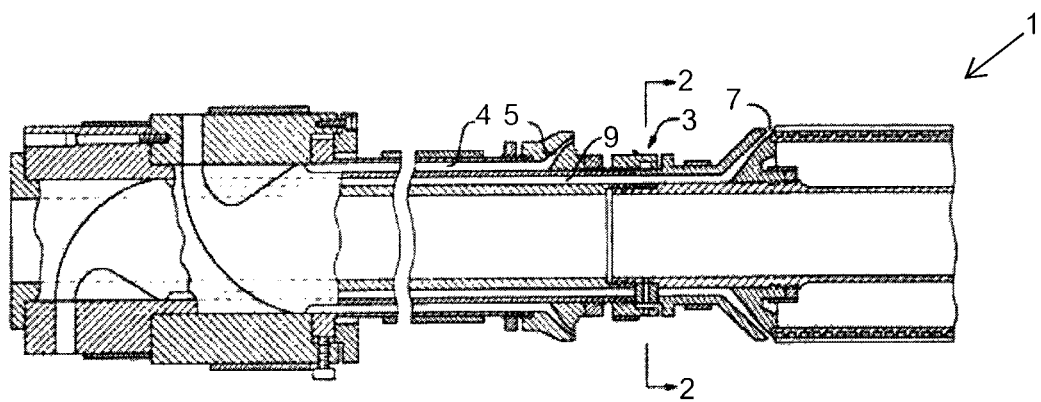
FIG. 2 is a side cross-sectional view of an extrusion die mandrel fitted with a spider according to an embodiment of the present invention.
Figure 3A:
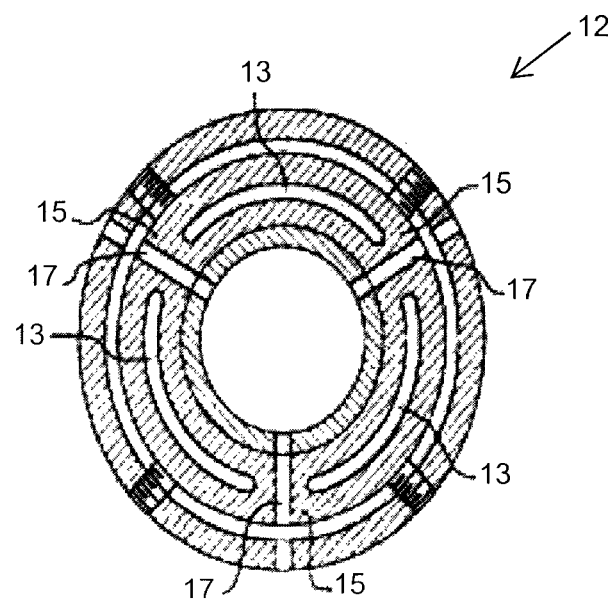
FIG. 3A is a front cross-sectional view along lines 2-2 of FIG. 2, showing a spider according to one embodiment of the present invention within the extrusion mandrel.
Figure 3B:
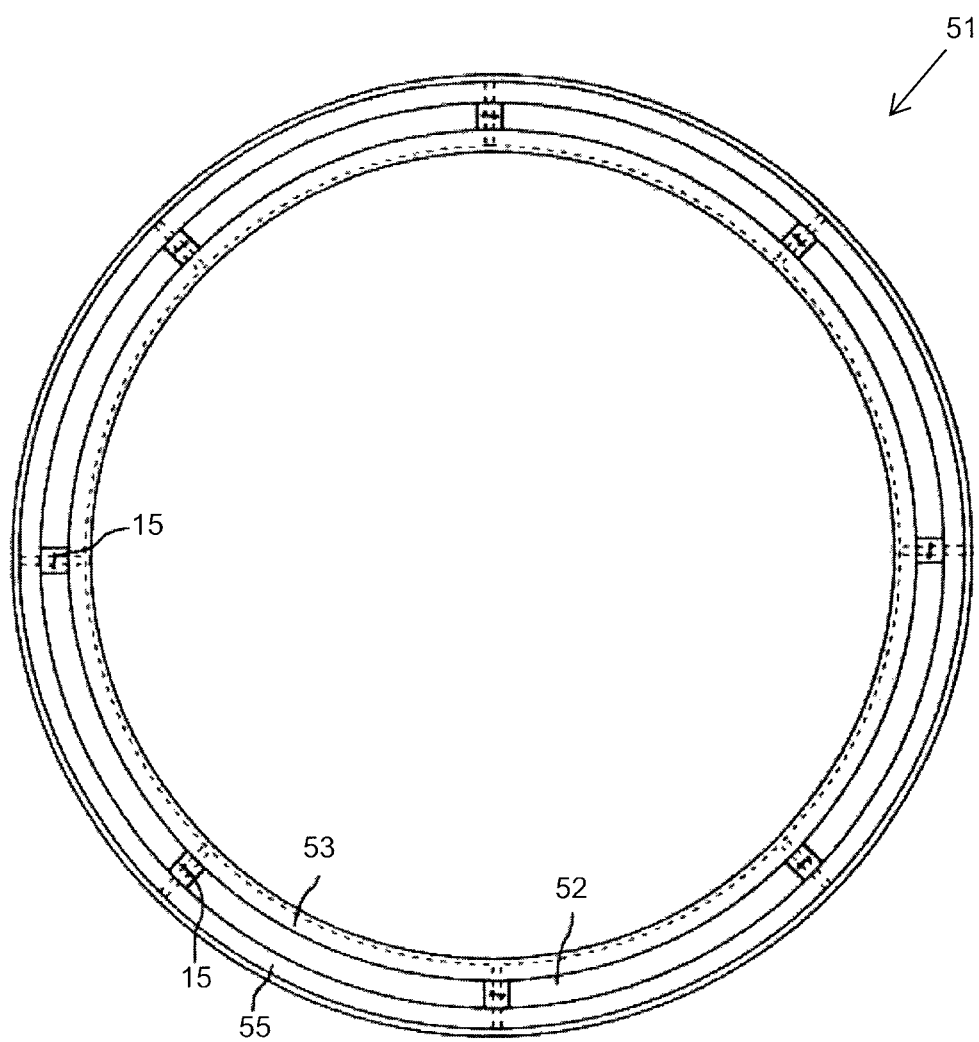
FIG. 3B is a cross-sectional view of a spider according to another embodiment of the present invention within the extrusion mandrel.

FIG. 2 shows an exemplary mandrel 1 of an extruder that may incorporate the present invention. The tubes of the mandrel 1 are centered and stabilized relative to one another by means of a spider located at position 3. Cross-sectional views of the intersection at lines 2-2 (i.e., the spider at position 3) are shown in FIGS. 3A and 3B. The mandrel 1 is used for the molding of double wall plastic pipes. The outer wall of a double wall plastic pipe is produced by a stream of plastic that flows along plastic flow path 4, terminating at the mandrel orifice 5. The mandrel orifice 5 is upstream of the spider at position 3. The mandrel 1 further includes a second plastic flow path 9, terminating at a second mandrel orifice 7. The plastic flows along this second plastic flow path 9 to the second mandrel orifice 7 to form the inner pipe wall. The second mandrel orifice 7 is located downstream of the spider at position 3; accordingly, the plastic flowing along second plastic flow path 9 must pass through the spider at the downstream position 3.

FIG. 3A is a front cross-sectional view of a spider 12 along lines 2-2 of FIG. 2. As shown in FIG. 3A, the spider 12 is formed of a plurality of concentric tubes. The spider 12 (located at position 3 of FIG. 2) is provided with a plurality of axially extending spider plastic flow paths 13 to allow the passage of the plastic through the spider 12. The plastic flows through the second plastic flow path 9 (shown in FIG. 2) and through the spider plastic flow paths 13. The plastic flows through the spider 12 and exits the mandrel 1 at second mandrel orifice 7 (shown in FIG. 2). The spider plastic flow paths 13 run between the different diameter ring portions of the spider 12. The ring portions are held together by spider legs 15. In one embodiment, the spider 12 may further include air and/or utility passages 17 for an air opening and/or utility. The air and/or utility passages 17 extend radially from the hollow center to the outside edge of the spider 12 through the spider legs 15. The spider legs 15 separate the air and/or utility passages 17 from the plastic flow paths 13.

FIG. 3B shows a cross-sectional view of a spider 51 according to another embodiment of the present invention. The spider 51 may be used in an extruder and is particularly suited for use in a die head and die tooling mandrel 1 (shown in FIG. 2) of a pipe forming apparatus used for making double wall plastic pipes. The spider 51 may be located at the downstream position 3 of FIG. 2.

When producing a double wall plastic pipe, the outer wall of the pipe exits the mandrel 1 at the mandrel orifice 5 (shown in FIG. 2), which is located upstream of the spider 51. The inner wall of the pipe exits the mandrel 1 at the second mandrel orifice 7, which is located downstream of the spider 51. Accordingly, the inner wall of the double wall pipe is formed by plastic that flows through axially extending plastic flow passages 52 of the spider 51.

The spider 51 is made from two separate and distinct rings. The inner ring 53 and the outer ring 55 are separated by the plastic flow passages 52. The spider legs 15 act as both spacers and connectors between the inner 53 and the outer rings 55.

Figure 4A:
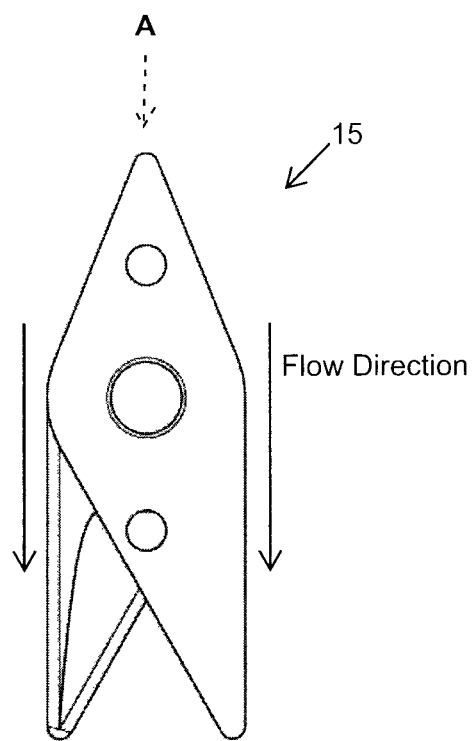
FIG. 4A shows a top view of a spider leg according to a further embodiment of the present invention.
Figure 4B:
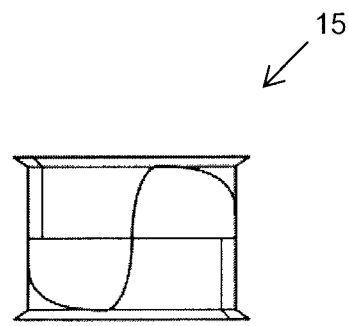
FIG. 4B shows a downstream view of the spider leg according to the further embodiment.

FIG. 4A shows a top view of a further embodiment of a spider leg 15 for use in a spider. FIG. 4A shows the direction of the flow of plastic along the spider leg 15. FIG. 4B shows a downstream view of the spider leg 15. As shown in FIG. 4B, the downstream portion of the spider leg 15 does not contain straight and right-angled channels. The downstream end of the spider 15 has curved flow guides that produce a stronger welding bond between the streams of plastic.

Figure 4C:
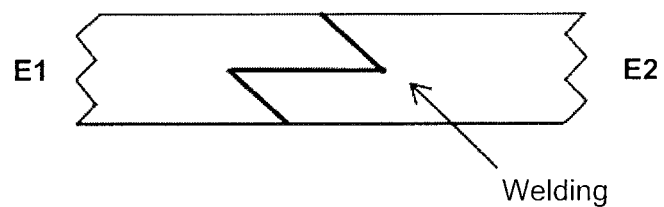
FIG. 4C shows the acute angle welding lines in the plastic pipe resulting from the spider leg according to the further embodiment.

FIG. 4C shows the acute angle of the welding lines that result from plastic flowing through a spider with spider legs 15. Different configurations of the curved flow guides produce different welding lines. The plastic flows through the mandrel 1 (shown in FIG. 2) to the downstream end of the spider legs 15. The spider legs 15 separate the flow of plastic into multiple streams. The multiple streams reunite as the final streams E1 and E2 at the downstream end of the spider leg 15. As shown in FIG. 4C, the final streams E1 and E2 join in an acute angled welding line that provides a stronger bond than the right-angled welding lines produced by the prior art spider legs.

Figure 5:
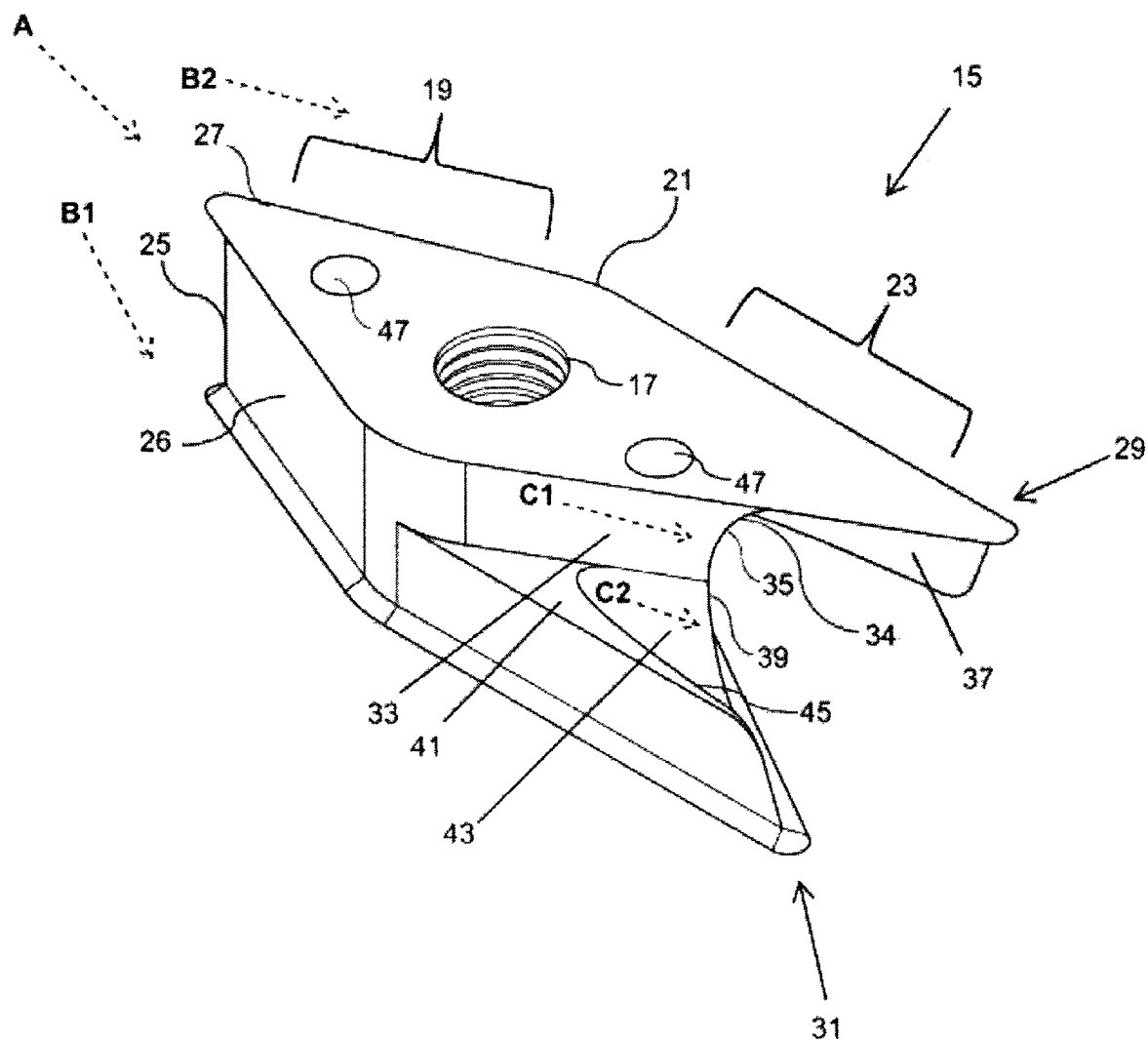
FIG. 5 is a perspective view of the spider leg according to the further embodiment.

FIG. 5 shows a spider leg 15 according to the further embodiment. The spider leg 15 comprises an upstream portion 19, a widened center portion 21, and a downstream portion 23. The upstream portion 19 has a front apex 25 that separates a first side surface 26 and a second side surface 27. The front apex 25 divides an incoming flow of plastic (stream A) that flows along the second plastic flow path 9 of the mandrel 1 (shown in FIG. 2). The flow of plastic stream A is divided into the independent streams B1 and B2. The independent stream B1 flows along the first side surface 26 and the independent stream B2 flows along the second side surface 27. After the independent streams B1 and B2 flow past the widened center portion 21, the independent stream B1 is split into further streams C1 and C2 and the independent stream B2 is split into further streams D1 and D2 (shown in FIG. 9). The further streams C1 and C2 and the further streams D1 and D2 each flow along one side of the downstream portion 23 and reunite at the downstream end of the spider 15 as the final streams E1 and E2, respectively.

The downstream portion 23 is comprised of an upper leg portion 29 and a lower leg portion 31. The upper leg portion 29 includes a first upper surface 33, a second upper surface 34, a third upper surface 35 and a fourth upper surface 37. The second upper surface 34, the third upper surface 35, and the fourth upper surface 37 are not visible in FIG. 5. Similarly, the lower leg portion 31 includes a first lower surface 39, a second lower surface 41, a third lower surface 43, and a fourth lower surface 45. The first lower surface 39 is not visible in FIG. 5. Accordingly, the first upper surface 33, the second lower surface 41, the third lower surface 43, and the fourth lower surface 45 comprise a first side of downstream portion 23 (i.e., the visible side in FIG. 5). The first lower surface 39, the second upper surface 34, the third upper surface 35, and the fourth upper surface 37 comprise a second side of downstream portion 23 (i.e., the non-visible side in FIG. 5). Accordingly, the independent stream B1 flows along the first side surface 26, past the widened center portion 21 and then along the first side of the downstream portion 23. Similarly, the independent stream B2 flows along the second side surface 27, past the widened center portion 21 and then along the second side of the downstream portion 23.

The upper leg portion 29 (i.e., the first 33, the second 34, the third 35, and the fourth upper surfaces 37) may be rotationally symmetrical or substantially rotationally symmetrical to the lower leg portion 31 (i.e., the first 39, the second 41, the third 43 and the fourth lower surfaces 45) along the longitudinal axis (see 600 of FIG. 6) of the spider leg 15. In other words, if the spider leg 15 was divided into two pieces by a horizontal center plane (see 120 of FIG. 11) along the longitudinal axis (see 600 of FIG. 6), the two resulting pieces would be identical. However, a skilled artisan would understand that the spider leg 15 could still create strong acute angled weld lines with non-rotationally symmetrical upper 29 and lower leg portions 31.

In a preferred embodiment, the first upper surface 33 and the first lower surface 39 are flat. The second upper surface 34 and the second lower surface 41 may also be flat. Alternatively, the second upper surface 34 and the second lower surface 41 may blend and curve smoothly into the third 35 and the fourth upper surfaces 37 and the third 43 and the fourth lower surfaces 45, respectively. The first upper surface 33 converges with the third upper surface 35 at an angle of less than 90° at the downstream end of the spider leg 15. Similarly, the first lower surface 39 converges with the third lower surface 43 at an angle of less than 90° at the downstream end of the spider leg 15. The edges where the first upper surface 33 and the first lower 39 converge with the third upper surface 35 and the third lower surface 43, respectively, are preferably in line with a vertical center plane (see 110 of FIG. 11).

The third 35 and the fourth upper surfaces 37 collectively form a concave shape on the upper leg portion 29. Similarly, the third 43 and the fourth lower surfaces 45 collectively form a concave shape on the lower leg portion 31. The third lower surface 43 is sloped radially outwards in a downward direction from the lower edge of the first upper surface 33 towards the lower edge of the fourth lower surface 45. The fourth lower surface 45 is sloped in a downward direction towards the lower edge of the third lower surface 43. Accordingly, the third 43 and the fourth lower surfaces 45 are abutting and sloped towards each other to create a concave flow guide that widens at the downstream end of the spider leg 15. In a preferred embodiment, the channel created at the junction of the third 43 and the fourth lower surfaces 45 is along an axis parallel or near parallel to the first upper surface 33.

Similarly, the third upper surface 35 is sloped radially outwards in an upward direction from the upper edge of the first lower surface 39 towards the fourth upper surface 37. The fourth upper surface 37 is sloped inwards towards the upper edge of the third upper surface 35. Accordingly, the third 35 and the fourth upper surfaces 37 are abutting and sloped towards each other to create a concave flow guide that widens at the downstream end of the spider leg 15. In a preferred embodiment, the channel created at the junction of the third 35 and the fourth upper surfaces 37 is along an axis parallel or near parallel to the first lower surface 39.

The upper and the lower surfaces are configured such that the further stream C1 flows along the first upper surface 33 to converge with the further stream D1 flowing along the second 34, the third 35, and the fourth upper surfaces 37. Similarly, the further stream C2 flows along the second 41, the third 43, and the fourth lower surfaces 45 to converge with the further stream D2 (see FIG. 9) flowing along the first lower surface 39.

The spider leg 15 is optionally fitted with an air and/or utility passage 17 that extends radially through the spider leg 15 at the widened center portion 21. When the spider leg 15 is fitted in the spider 12 (shown in FIG. 3A), the air and/or utility passage 17 extends radially from the hollow center of the spider 12 to the outside edge of the spider 12. The air and/or utility passage 17 may also be bordered on either side by dowel holes 47. The dowel holes 47 are for receiving dowel pins to secure the spider leg 15 to the spider 51 (shown in FIG. 3B). Specifically, the dowel pins hold the inner ring 53 and the outer ring 55 of the spider 51 together. The dowel pins may be accessible to enable the quick release of the spider leg 15 from the inner ring 53 and the outer ring 55. The quick release function enables the spider 51 to be dismantled if the spider leg 15 becomes damaged or requires servicing.

Figure 6:
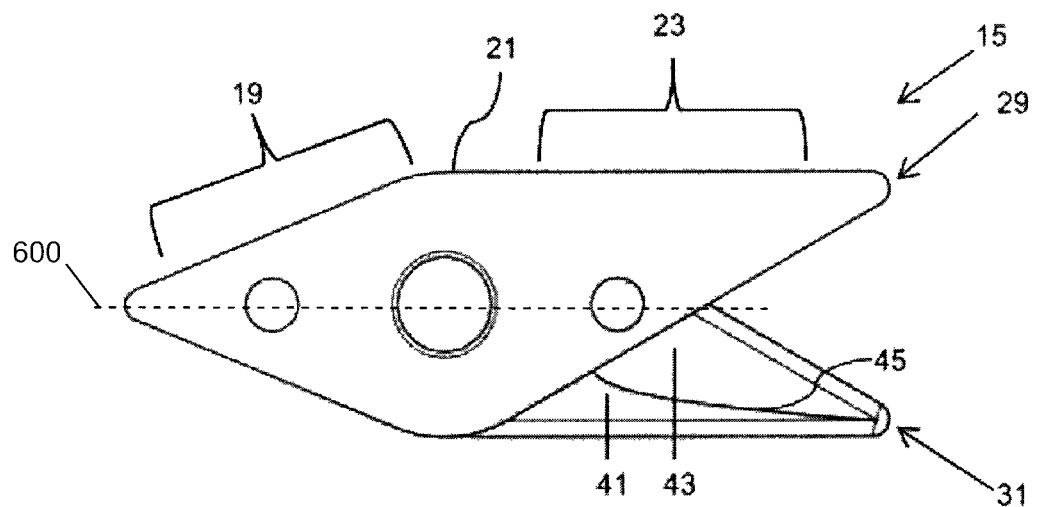
FIG. 6 is a top view of the spider leg according to the further embodiment.

FIG. 6 shows a top view of the upstream portion 19, the widened center portion 21, and the downstream portion 23 of the spider leg 15. The downstream portion 23 shows that the upper leg portion 29 and the lower leg portion 31 are staggered or offset from each other. The upper leg portion 29 and the lower leg portion 31 act as guides to direct the flow of plastic towards the longitudinal axis 600 of the spider leg 15. The lower leg portion 31 shows a flat second lower surface 41 and a curved third lower surface 43 and a curved fourth lower surface 45 that collectively direct the flow of plastic towards the longitudinal axis 600 of the spider leg 15.

Figure 7:
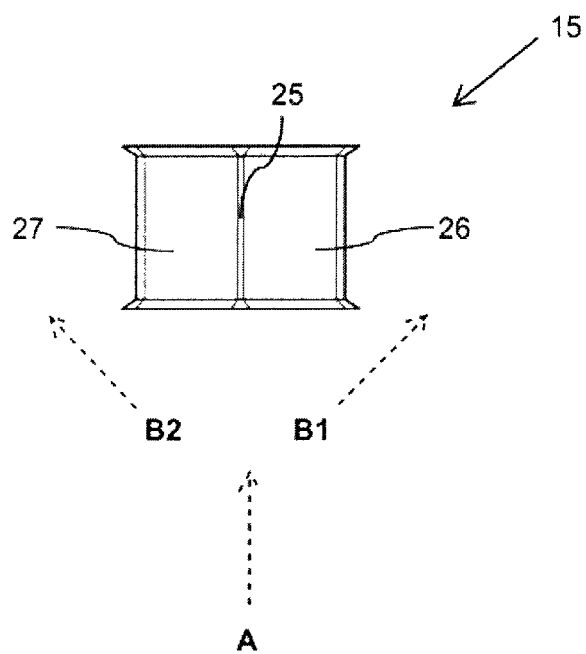
FIG. 7 is an upstream view of the spider leg according to the further embodiment.

FIG. 7 shows an upstream view of the spider leg 15. The stream A, after flowing through the mandrel 1 (shown in FIG. 2), is split by the spider leg 15 into the independent streams B1 and B2 by the front apex 25. The independent stream B1 is diverted along the first side surface 26 and the independent stream B2 is diverted along the second side surface 27.

Figure 8:
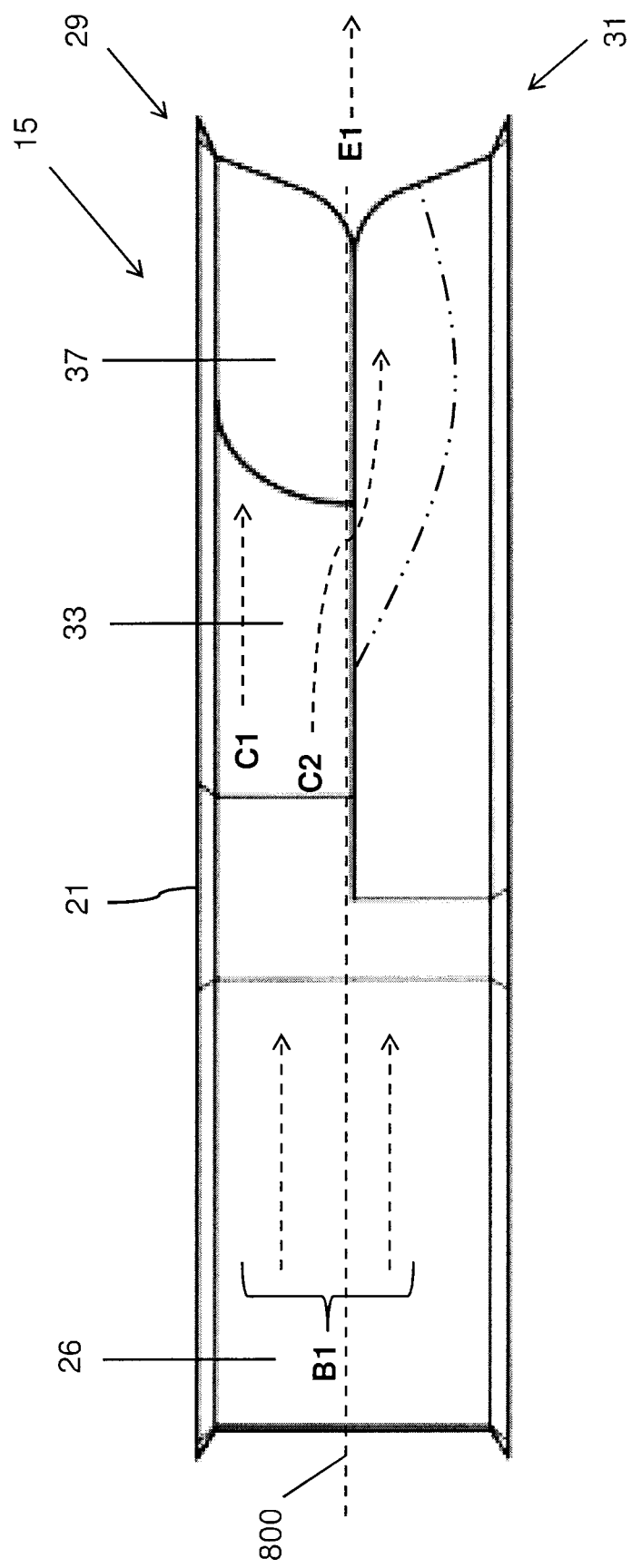
FIG. 8 is a first side view of the spider leg according to the further embodiment.

FIG. 8 shows a view of the flow path of the independent stream B1 (i.e., a view of the spider leg 15 along the first side surface 26 and the first side of the downstream portion 23). The spider leg 15 divides the independent stream B1 into the further streams C1 and C2 after the independent stream B1 flows past the widened center portion 21. While the plastic flows in slightly different directions, the further streams C1 and C2 may still be one stream of plastic that has portions flowing along different surfaces.

A portion of the independent stream B1 is redirected along the first upper surface 33 of the upper leg portion 29 (further stream C1). The further stream C1 is directed towards the junction where the third upper surface 35 (see FIG. 10) abuts the fourth upper surface 37. By flowing towards the junction between the third upper surface 35 and the fourth upper surface 37, the further stream C1 is directed towards the further stream D1. The further streams C1 and D1 converge at or near a vertical center plane (see 110 in FIG. 11) at the downstream end of the spider leg 15. In a preferred embodiment, the further streams C1 and D1 converge at or near the longitudinal axis 800 at the downstream end of the spider leg 15.

The remaining portion of the independent stream B1 flows along the second 41 and the third lower surfaces 43 (see FIG. 5) towards the fourth lower surface 45 (further stream C2). The fourth lower surface 45 (see FIG. 5) directs the further stream C2 inwards towards a vertical center plane (see 110 in FIG. 11). Accordingly, the further stream C2 is directed towards the further streams D1 and D2. In a preferred embodiment, the further stream C2 converges with the further streams D1 and D2 at or near the longitudinal axis 800 at the downstream end of the spider leg 15.

Figure 9:
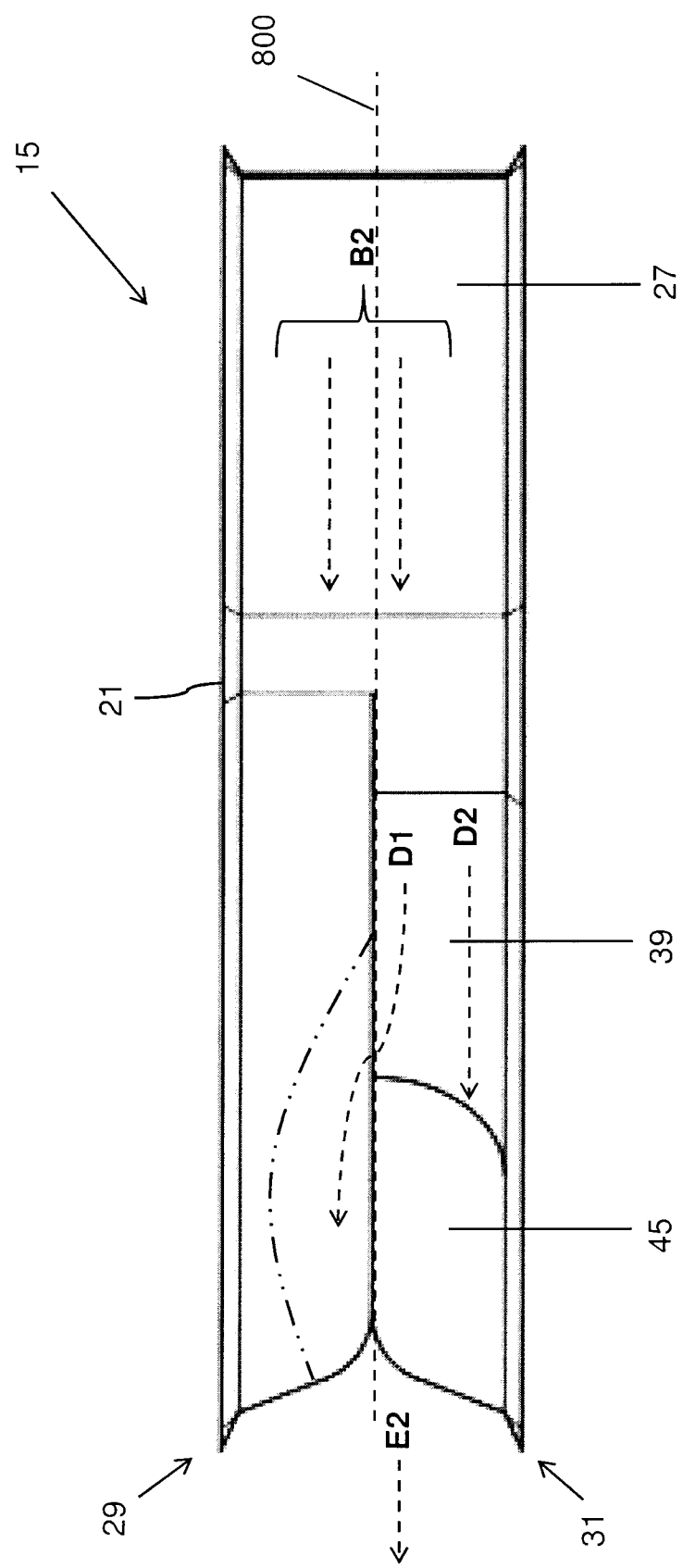
FIG. 9 is a second side view of the spider leg according to the further embodiment.

FIG. 9 shows a view of the flow path of the independent stream B2 (i.e., a view of the spider leg 15 along the second side surface 27 and the second side of the downstream portion 23). The spider leg 15 divides the independent stream B2 into the further streams D1 and D2 after the independent stream B2 flows past the widened center portion 21. While the plastic flows in slightly different directions, the further streams D1 and D2 may still be one stream of plastic that has portions flowing along different surfaces.

A portion of the independent stream B2 flows along the second 34 and the third upper surfaces 35 (see FIG. 10) towards the fourth upper surface 37 (further stream D1). The fourth upper surface 37 (see FIG. 10) directs the further stream D1 inwards towards a vertical center plane (see 110 in FIG. 11) at or near the longitudinal axis 800 at the downstream end of the spider leg 15. Accordingly, the further stream D1 is directed towards the further streams C1 and C2 (see FIG. 12). In a preferred embodiment, the further stream D1 converges with the further streams C1 and C2 at or near the longitudinal axis 800 at a downstream end of the spider leg 15.

Referring again to FIG. 9, the remaining portion of the independent stream B2 flows along the first lower surface 39 of the lower leg portion 31 (further stream D2). The further stream D2 is directed towards the junction where the third lower surface 43 abuts the fourth lower surface 45 (see FIG. 5). By flowing towards the junction between the third lower surface 43 and the fourth lower surface 45, the further stream D2 is directed towards the further stream C2 (see FIG. 12). The further streams C2 and D2 converge at a vertical center plane 110 (see 110 in FIG. 11) at the downstream end of the spider leg 15.

The further streams C1 and C2 collectively form the final stream E1 (see FIG. 8) at the downstream end of the spider 15 and the further streams D1 and D2 collectively form the final stream E2 (see FIG. 9) at the downstream end of the spider 15. The turbulence caused by the further streams C2 and D1 flowing towards each other provides a strong welding bond between the plastic streams. Further turbulence is caused by directing the further streams C1 and D2 towards the further streams D1 and C2, respectively. The turbulence results in the final streams E1 and E2 joining each other in an overlapping bond or welding at an acute angle. Specifically, the final streams E1 and E2 converge at a vertical center plane (see 110 in FIG. 11) at a downstream end of the spider leg 15. In a preferred embodiment, the final streams E1 and E2 converge at or near the longitudinal axis 800 at the downstream end of the spider leg 15. Accordingly, the final streams E1 and E2 bond together to form the acute angled welding lines shown in FIG. 4C.

Figure 10:
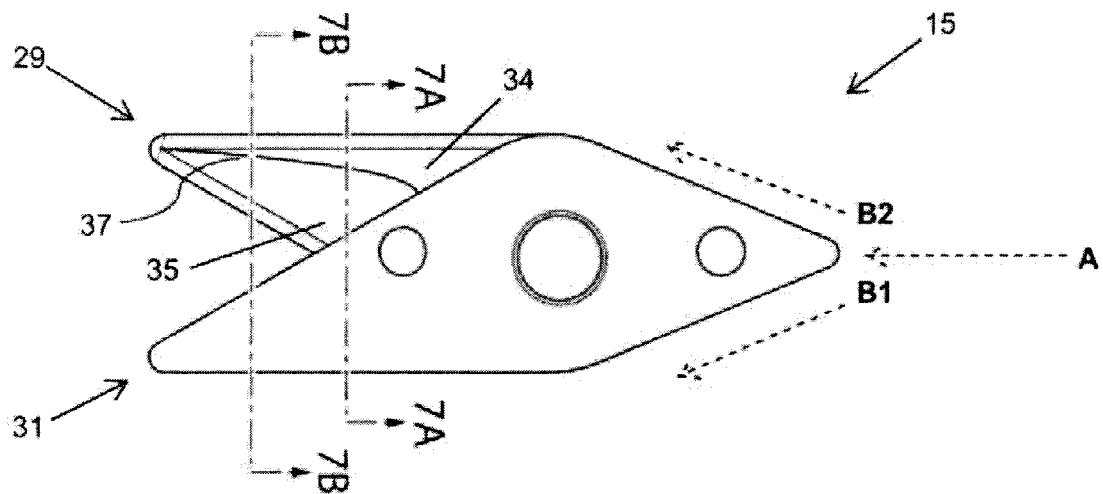
FIG. 10 is a bottom view of the spider leg according to the further embodiment.

FIG. 10 is a bottom view of the spider leg 15 showing plastic stream A divided into the independent streams B1 and B2 that flow along the first side surface 26 and the second side surface 27 (see FIG. 5), respectively. The upper leg portion 29 has a flat second upper surface 34, a curved third surface 35 and a curved fourth upper surface 37 that direct the flow of plastic. FIG. 10 also shows intersecting lines 7A-7A and 7B-7B, to illustrate the flow passages of the spider leg 15 in FIGS. 11 and 12, respectively.

Figure 11:
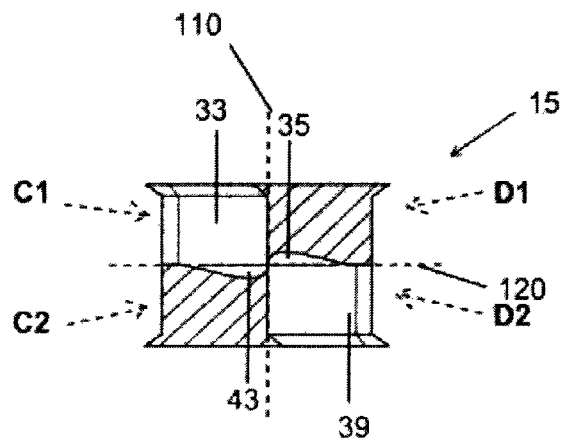
FIG. 11 is a cross-sectional downstream view of the spider leg according to the further embodiment, viewed along lines 7A-7A of FIG. 10.

FIG. 11 shows a downstream cross-sectional view of the spider leg 15 along lines 7A-7A of FIG. 10. FIG. 11 divides the spider leg 15 into four (4) sections by a vertical center plane 110 and a horizontal center plane 120. As can be seen, the third upper surface 35 and the third lower surface 43 each begin to form a concave shape at lines 7A-7A (shown in FIG. 10).

Figure 12:
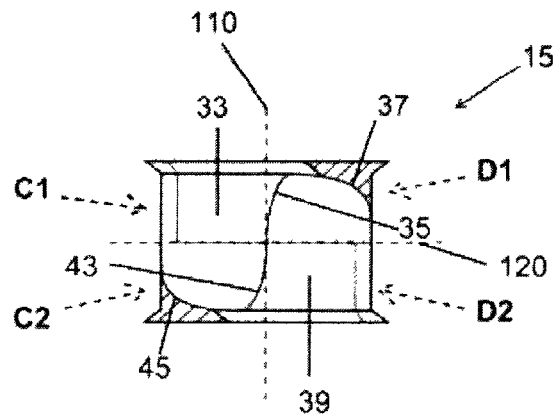
FIG. 12 is a cross-sectional view of the spider leg according to the further embodiment, viewed along lines 7B-7B of FIG. 10.

FIG. 12 shows the downstream cross-sectional view of the spider leg 15 along lines 7B-7B of FIG. 10. As can be seen, the spider leg 15 has an upper concave shape formed by the third 35 and the fourth upper surfaces 37 and a lower concave shape formed by the third 43 and the fourth lower surfaces 45.

Figure 13A:
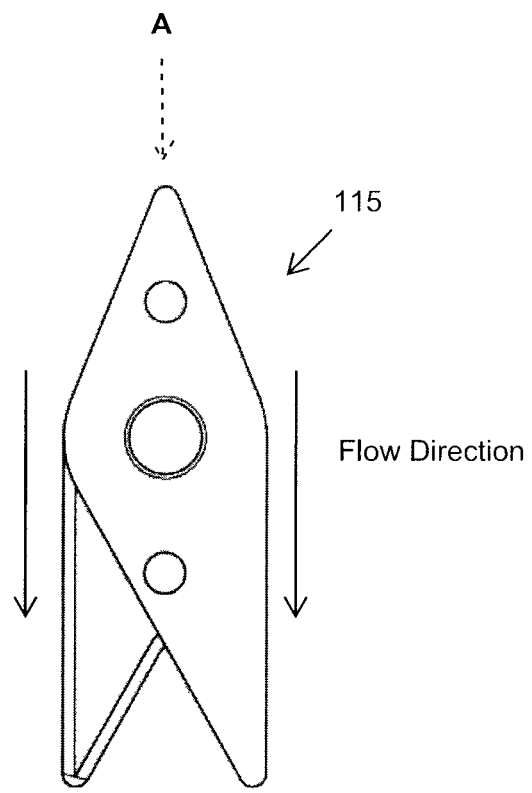
FIG. 13A shows a top view of a spider leg according to an alternative embodiment of the present invention.
Figure 13B:
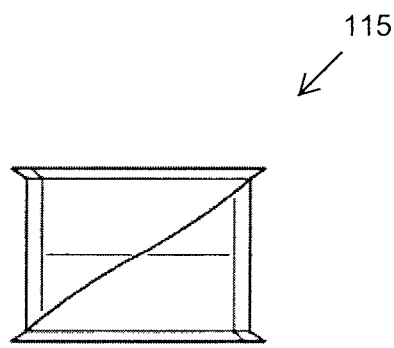
FIG. 13B shows a downstream view of the spider leg according to the alternative embodiment.

FIG. 13A shows a top view of an alternative embodiment of the present invention. FIG. 13A shows the direction of the flow of plastic along the spider leg 115. FIG. 13B shows a downstream view of the spider leg 115. As shown in FIG. 13B, the downstream portion of the spider leg 115 does not contain straight and right-angled channels. The downstream end of the spider 15 has curved flow guides that produce a stronger welding bond between the layers of plastic.

Figure 13C:
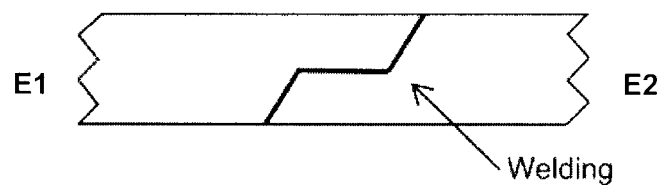
FIG. 13C shows the obtuse angle welding lines that result from the spider leg according to the alternative embodiment.

FIG. 13C shows the obtuse angle of the welding lines that result from plastic flowing through a spider with the spider legs 115 according to the present invention. As shown in FIGS. 4C and 13C, different configurations of the curved flow guides produce different welding lines. The spider leg 115 separates the flow of plastic into multiple streams. The multiple streams reunite as the final streams E1 and E2 at the downstream end of the spider leg 115. As shown in FIG. 13C, the final streams E1 and E2 join in an obtuse angled welding line that provides a stronger bond than the right-angled welding lines produced by the prior art spider legs.

Figure 14:
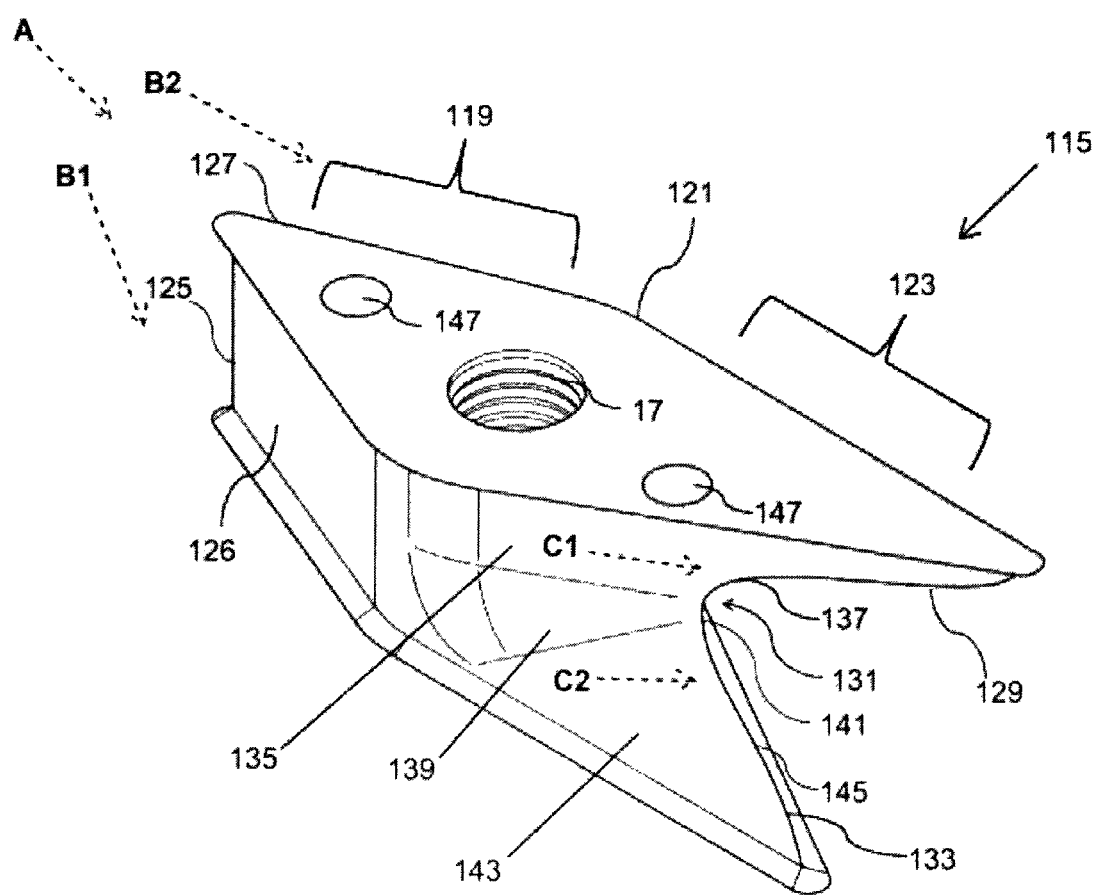
FIG. 14 is a perspective view of the spider leg according to the alternative embodiment.

FIG. 14 shows a spider leg 115 according to an alternative embodiment. The spider leg 115 comprises an upstream portion 119, a widened center portion 121, and a downstream portion 123. The upstream portion 119 has a front apex 125 leading to a first side surface 126 and a second side surface 127. The front apex 125 divides an incoming flow of plastic, stream A, into independent plastic streams B1 and B2. The independent stream B1 flows along the first side surface 126 and the independent stream B2 flows along the second side surface 127. After the independent streams B1 and B2 flow past the widened center portion 121, the independent stream B1 is split into further streams C1 and C2 and the independent stream B2 is split into further streams D1 and D2 (see FIG. 18). The further streams C1 and C2 and the further streams D1 and D2 each flow along one side of the downstream portion 123 and reunite at the downstream end of the spider 15 as two final streams E1 and E2, respectively.

Referring again to FIG. 14, the downstream portion 123 is comprised of an upper leg edge 129, a middle point 131 and a lower leg edge 133 that collectively separate a first side and a second side of the spider leg 115. The upper leg edge 129, the middle point 131 and the lower leg edge 133 collectively form a substantially twisted C-shape at the downstream end of the spider leg 115. The upper leg edge 129 is the intersecting edge between the first upper surface 135 and the second upper surface 137. The middle point 131 is the intersecting point between the first middle surface 139 and the second middle surface 141. Lastly, the lower leg edge 133 is the intersecting edge between the first lower surface 143 and the second lower surface 145.

The first side of the downstream portion 123 includes a first upper surface 135, a first middle surface 139, and a first lower surface 143. In a preferred embodiment, the first upper surface 135 is flat and the first middle surface 139 and the first lower surface 143 collectively form a concave flow guide. The lower edge of the first upper surface 135 abuts the upper edge of the first middle surface 139. The first middle surface 139 curves radially outwards in a downward direction towards the upper edge of the first lower surface 143. The first lower surface 143 curves radially inwards in an upward direction towards the first middle surface 139, the middle point 131, and the lower leg edge 133. Specifically, the first lower surface 143 abuts the first middle surface 139 on the upstream side and converges with the middle point 131 and the lower leg edge 133 on the downstream side to form a lower ramp. Accordingly, the first middle surface 139 and the first lower surface 143 are curved in opposite directions and towards each other in a manner that directs the further stream C2 upwards towards the middle point 131.

Similarly, the second side includes a second upper surface 137, a second middle surface 141, and a second lower surface 145. In a preferred embodiment, the second lower surface 145 is flat and the second middle surface 141 and the second upper surface 137 collectively form a concaved flow guide. The upper edge of the second lower surface 145 abuts the lower edge of the second middle surface 141. The second middle surface 141 curves radially outwards in an upward direction towards the lower edge of the second upper surface 137. The second upper surface 137 curves radially inwards in a downward direction towards the second middle surface 141, the middle point 131, and the lower leg edge 133. Specifically, the second upper surface 137 abuts the second middle surface 141 on the upstream side and converges with the middle point 131 and the lower leg edge 133 on the downstream side of the spider leg 115 to form an upper ramp. Accordingly, the second middle surface 141 and the second upper surface 137 are curved in opposite directions and towards each other in a manner that directs the further stream D1 (see FIG. 18) downwards towards the middle point 131.

The first side of the downstream portion 123 may be rotationally symmetrical or substantially rotationally symmetrical to the second side of the downstream portion 123 around a longitudinal axis (see 150 of FIG. 15) of the spider leg 115. However, a skilled artisan would understand that the spider leg 115 could still create strong obtuse angled weld lines with non-rotationally symmetrical first and second sides of the downstream portion 123.

Referring again to FIG. 14, after stream A is diverted into two independent streams B1 and B2, the independent stream B1 is further diverted into further streams C1 and C2. The further stream C1 flows along the first upper surface 135 and the further stream C2 flows along the first middle surface 139 and the first lower surface 143. Similarly, the independent stream B2 is further diverted into further streams D1 and D2 (see FIG. 18). The further stream D1 flows along the second middle surface 141 and the second upper surface 137 and the further stream D2 flows along the second lower surface 145. A skilled artisan will understand that while the two independent streams B1 and B2 flow independently of each other, the further streams C1 and C2 and the further streams D1 and D2 may form single streams of plastic, respectively, that flow along different surfaces.

Figure 17:
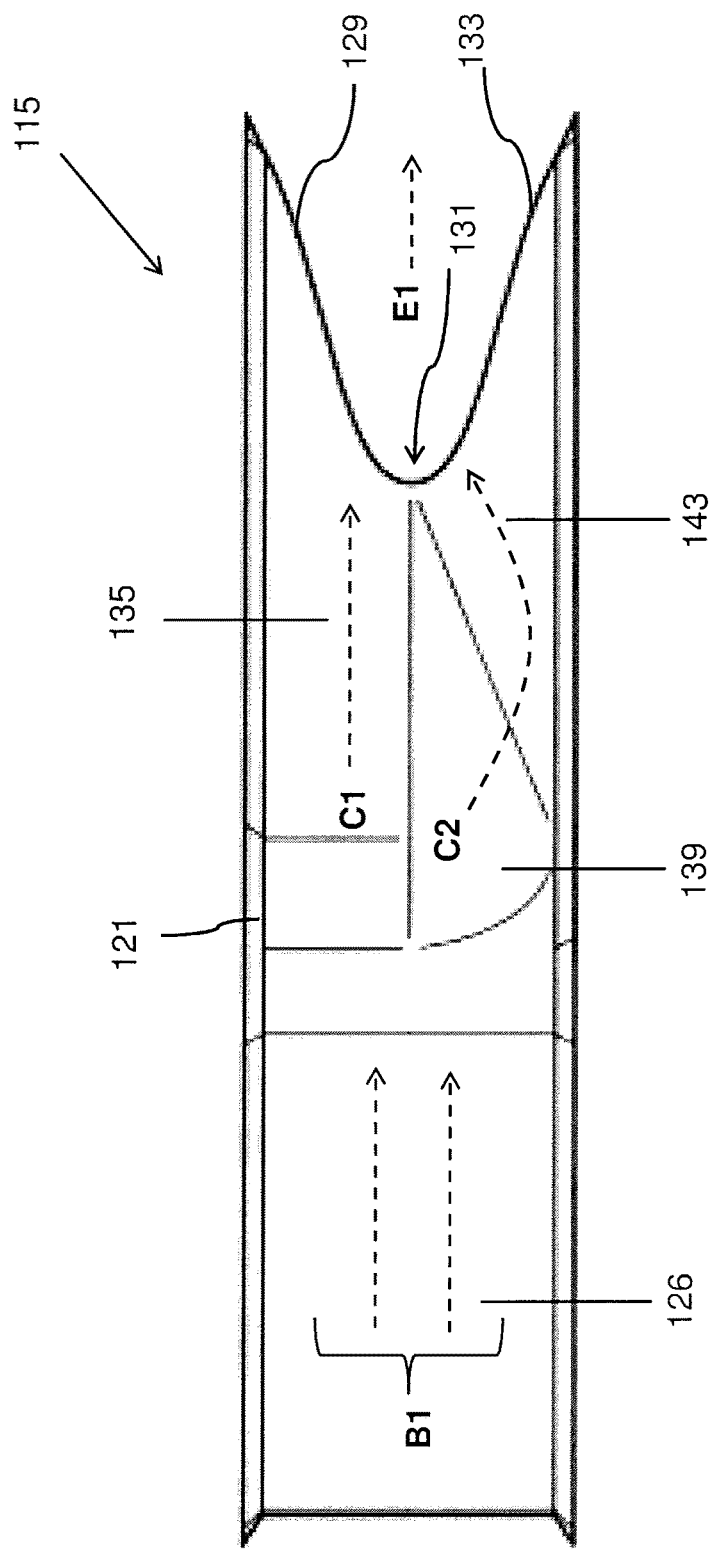
FIG. 17 is a first side view of the spider leg according to the alternative embodiment.

The further streams C1 and C2 converge at a downstream end of the spider leg 115, collectively becoming the final stream E1 (see FIG. 17). The further streams D1 and D2 converge at a downstream end of the spider leg 115, collectively becoming the final stream E2 (see FIG. 18). The final streams E1 and E2 converge along the upper leg edge 129, the middle point 131 and the lower leg edge 133 at the downstream end of the spider leg 115. Preferably, the final stream E1 and the final stream E2 converge at the middle point 131. The first and second sides of the downstream portion 123 each have concave shapes that act as curved flow guides to direct the flow of the further streams C1 and C2 towards the other side's further streams D1 and D2. These curved flow guides cause turbulence in the streams of plastic. When the final streams E1 and E2 converge at the upper leg edge 129, the middle point 131 and the lower leg edge 133, the final streams E1 and E2 bond to form the obtuse angle welding line shown in FIG. 13C.

The spider leg 115 is optionally fitted with an air and/or utility passage 17 that extends radially through the spider leg 115 at the widened center portion 121. When the spider leg 115 is fitted in the spider 12 (shown in FIG. 3A), the air and/or utility passage 17 extends radially from the hollow center of the spider 12 to the outside edge of the spider 12. The air and/or utility passage 17 may also be bordered on either side by dowel holes 147. The dowel holes 147 are for receiving dowel pins to secure the spider leg 115 to the spider 51 (shown in FIG. 3B). Specifically, the dowel pins hold the inner ring 53 and the outer ring 55 of the spider 51 together.

Figure 15:
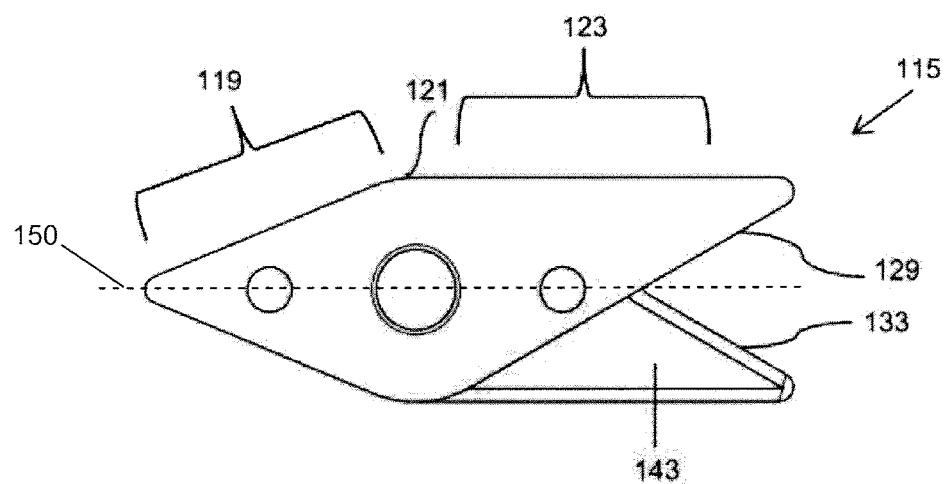
FIG. 15 is a top view of the spider leg according to the alternative embodiment.

FIG. 15 shows a top view of the upstream portion 119, the widened center portion 121, and the downstream portion 123 of the spider leg 115. FIG. 15 shows that the downstream end of the upper leg edge 129 and the lower leg edge 133 are staggered or offset from each other. The upper 129 and the lower leg edges 133 act as guides to direct the streams of plastic inwards towards the longitudinal axis 150 of the spider leg 115.

Figure 16:
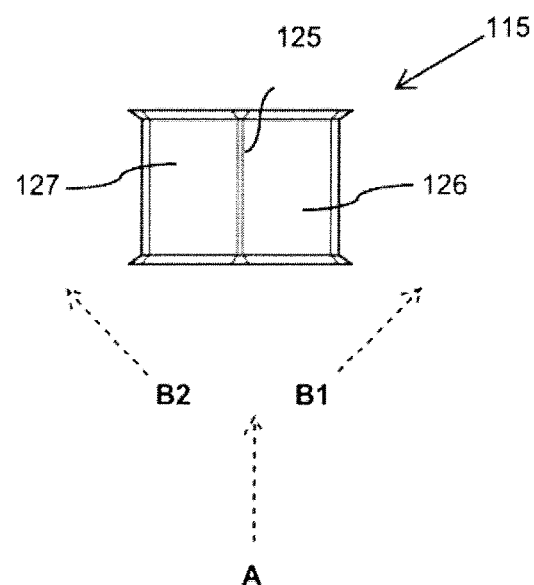
FIG. 16 is an upstream view of the spider leg according to the alternative embodiment.

FIG. 16 shows an upstream view of the spider leg 115. As previously described, the stream A is split at the front apex 125 into two independent plastic streams B1 and B2. The independent streams B1 and B2 are diverted along the first side surface 126 and the second side surface 127, respectively.

FIG. 17 shows a view of the flow path of the independent stream B1 (i.e., a view of the spider leg 115 along the first side surface 126 and the first side of the downstream portion 123). The independent stream B1 is divided into the further streams C1 and C2 after flowing past the widened center portion 121. The further stream C1 flows alongside the first upper surface 135 and is directed towards the further stream D1 (see FIG. 18). The further stream C2 flows along the first middle surface 139 and is directed towards the first lower surface 143. The first lower surface 143 directs the further stream C2 radially inwards in an upward direction towards the middle point 131. Accordingly, the curved flow guide formed by the first middle surface 139 and the first lower surface 143 directs the further stream C2 to converge with the further stream D1. The final stream E1 converges with the final stream E2 along the upper leg edge 129, the middle point 131 and the lower leg edge 133. Preferably, the final stream E1 converges with the final stream E2 at or near the middle point 131.

Figure 18:
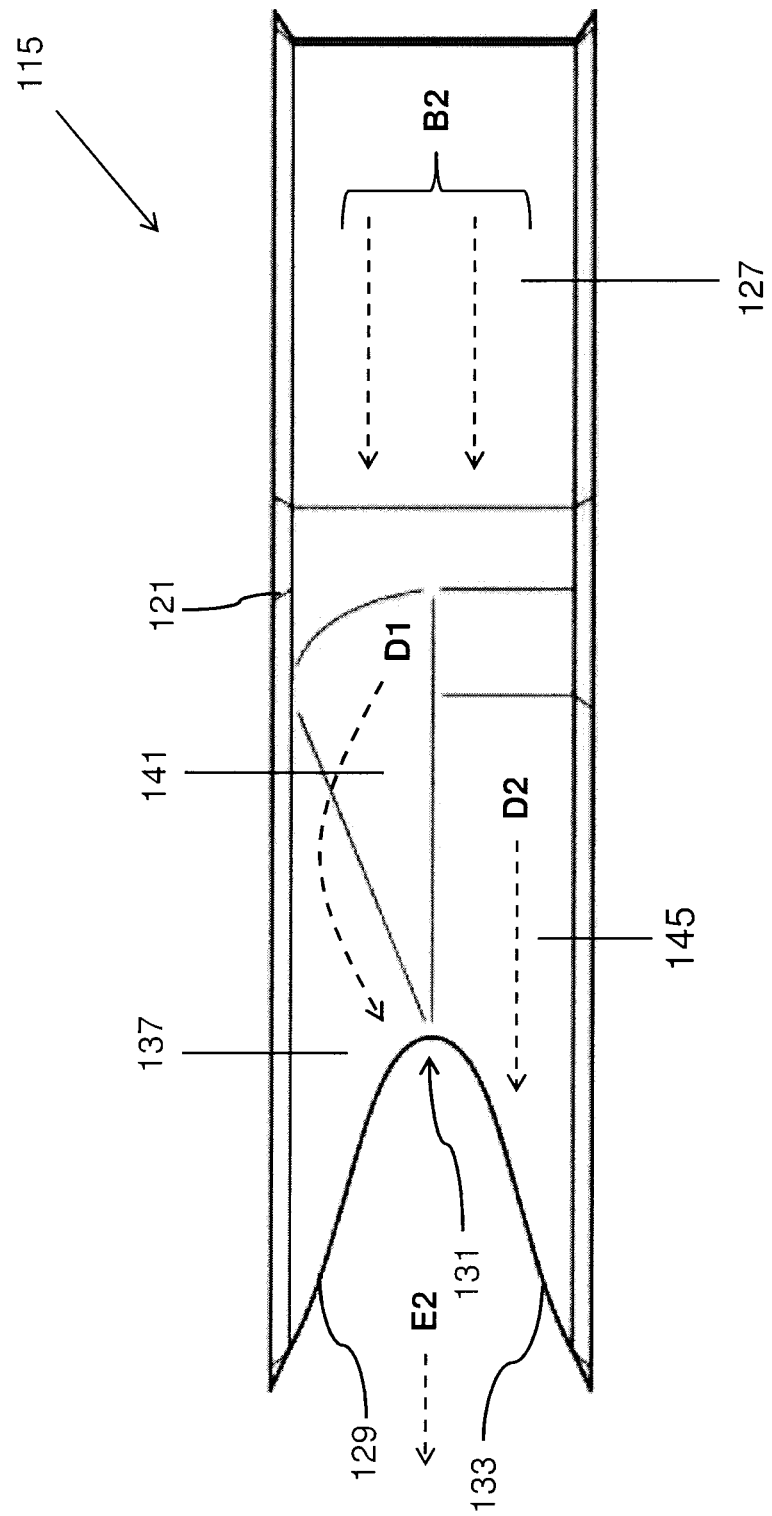
FIG. 18 is a second side view of the spider leg according to the alternative embodiment.

FIG. 18 shows a view of the flow path of the independent stream B2 (i.e., a view of the spider leg 115 along the second side surface 127 and the second side of the downstream portion 123). The independent stream B2 is divided into the further streams D1 and D2 after flowing past the widened center portion 121. The further stream D1 flows along the second middle surface 141 and is directed towards the second upper surface 137. The second upper surface 137 directs the further stream D1 radially inwards in a downward direction towards the middle point 131. The further stream D2 flows along the second lower surface 145 and is directed towards the further stream C2 (see FIG. 17). Accordingly, the curved flow guide formed by the second upper surface 137 and the second middle surface 141 directs the further stream D1 to converge with the further stream C2

Figure 19:
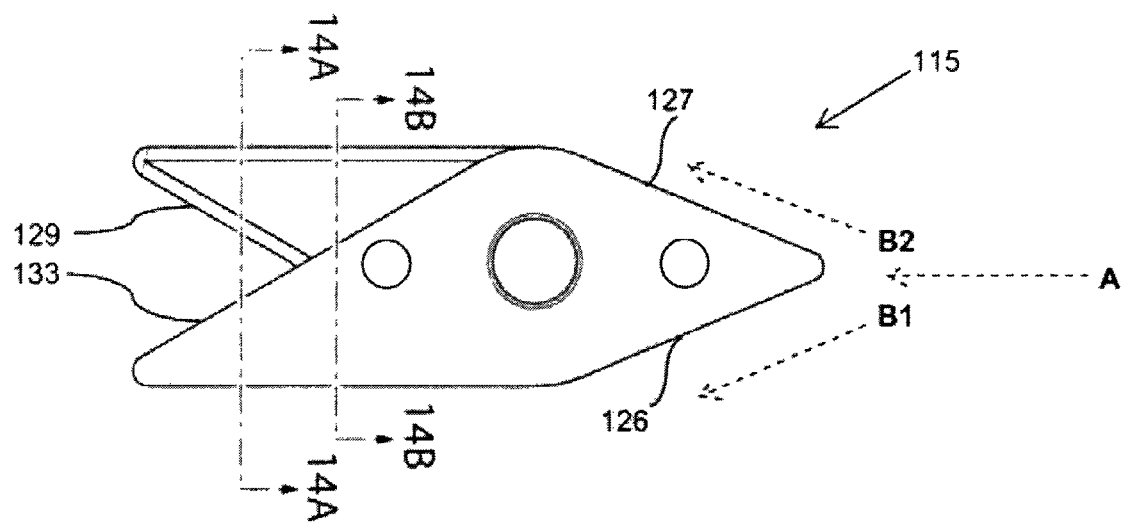
FIG. 19 is a bottom view of the spider leg according to the alternative embodiment.

FIG. 19 is a bottom view of the spider leg 115 showing the stream A divided into two independent streams B1 and B2 that flow along the first side surface 126 and the second side surface 127, respectively. FIG. 19 also shows intersecting lines 14B-14B and 14A-14A, to illustrate the flow passages of the spider leg 115 in FIGS. 20 and 21, respectively.

Figure 20:
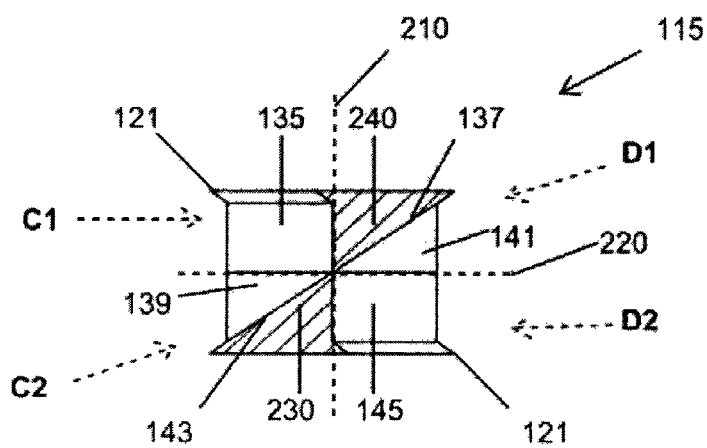
FIG. 20 is a cross-sectional view of the spider leg according to the alternative embodiment, viewed along lines 14B-14B of FIG. 19.

FIG. 20 shows a downstream cross-sectional view of the spider leg 115 along lines 14B-14B of FIG. 19. FIG. 20 divides the spider leg 115 into four (4) sections by a vertical center plane 210 and a horizontal center plane 220. The upper left section shows that the first upper surface 135 extends from the vertical center plane 210 across to the widened center portion 121. Similarly, the second lower surface 145 extends from the vertical center plane 210 across to the widened center portion 121, shown in the bottom right section.

The bottom left section shows the downward slope of the first middle surface 139. The interior portion 230 shows that the upward slope of the first lower surface 143 directs the further stream C1 in an upward direction towards the center of the spider leg 115, indicated at the intersection of the vertical center plane 210 and the horizontal center plane 220. Similarly, the upper right section shows the upward slope of the second middle surface 141. The second interior portion 240 shows that the downward slope of the second upper surface 137 directs the further stream D1 in a downward direction towards the middle of the spider leg 115.

Figure 21:
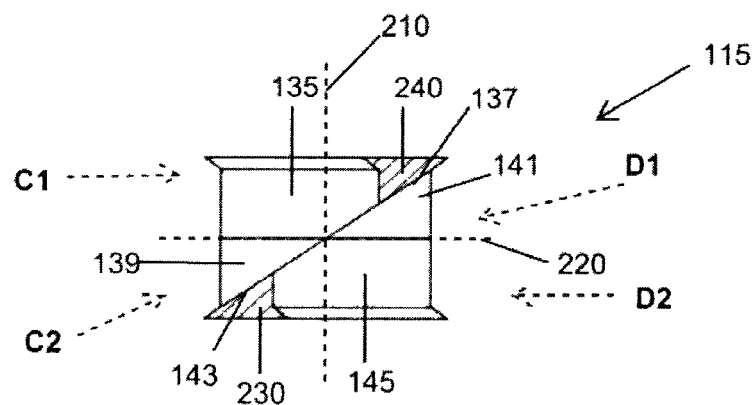
FIG. 21 is a cross-sectional view of the spider leg according to the alternative embodiment, viewed along lines 14A-14A of FIG. 19.

FIG. 21 shows a downstream cross-sectional view of the spider leg 115 along lines 14A-14A of FIG. 19. The first upper surface 135 extends across the vertical center plane 210 and directs the further stream C1 towards the junction between the second upper surface 137 and the second middle surface 141. Similarly, the second lower surface 145 extends across the vertical plane 210 and directs the further stream D2 towards the junction between the first middle surface 139 and the first lower surface 143. The interior portion 230 and the second interior portion 240 show the slopes of the first lower surface 143 and the second upper surface 137, respectively. Accordingly, the first lower surface 143 and the second upper surface 137 direct the further streams C2 and D1, respectively, towards the middle point 131 (see FIG. 14). The middle point 131 is located at the intersection of the vertical center plane 210 and the horizontal center plane 220. As such, the further streams C1 and C2 (collectively the final stream E1) and the further streams D1 and D2 (collectively the final stream E2) are directed towards each other and converge at the downstream end of the spider leg 115.

A skilled artisan will understand that the spider leg 15 (FIGS. 4 to 12) or the spider leg 115 (FIGS. 13 to 21) can be used in either embodiment of the spider 12 (FIG. 3A) or the spider 51 (FIG. 3B). Furthermore, either spider leg 15 or 115 may have air and/or utility passages 17 to provide an air opening and/or utility opening. Furthermore, either embodiment of the spider leg 15 or 115 may have dowel holes 47 or 147, respectively. Accordingly, either embodiment of the spider leg 15 or 115 may be operatively or mechanically coupled to the spider 51 by inserting dowel pins in the dowel holes 47 or 147, respectively.

As a result of all of the above, there is substantial turbulence caused by a spider using the spider legs 15 or 115 of the present invention in mandrel 1. Specifically, the original stream A flows through the spider 12 or 51 and is split into multiple smaller streams. The smaller streams are redirected towards each other at the downstream end of each spider leg 15 or 115 prior to exiting the spider 12 or 51. This turbulence and subsequent convergence greatly improves bonding of all of the streams, over and above the standard butt welding or right angle welding lines provided for in the prior art.

A person understanding this invention may now conceive of alternative structures and embodiments or variations of the above all of which are intended to fall within the scope of the invention as defined in the claims that follow.

We claim:

1. A spider for a die head and die tooling, wherein said spider comprises:
   a plurality of internal plastic flow passages extending axially through said spider; and
   a spider leg between each of said plurality of internal plastic flow passages;
   wherein said spider leg comprises:
      an upstream portion;
      a center portion; and
      a downstream portion;
   wherein said upstream portion has a front apex for dividing a stream of plastic in the die head and die tooling into a first stream on a first side of said spider leg and a second stream on a second side of said spider leg;
   wherein said downstream portion further comprises an upper curved flow guide and a lower curved flow guide, said upper curved flow guide is on said second side and said lower curved flow guide is on said first side;
   wherein said first side includes an upper surface that abuts with the lower flow guide and said second side includes a lower surface that abuts with said upper curved flow guide, and said lower surface and said upper surface are flat;
   wherein said upper curved flow guide and said lower curved flow guide direct the first stream and the second stream towards each other to bond with one another after flowing around said spider leg;
   wherein said lower curved flow guide directs at least a portion of the first stream towards a vertical plane along a longitudinal axis of said spider leg; and
   wherein said upper flow guide directs at least a portion of the second stream towards said vertical plane.

2. The spider according to claim 1, wherein said spider is a multiple piece construction comprising an inner spider ring and an outer spider ring, said inner spider ring and said outer spider ring being formed separately, and wherein said inner spider ring and said outer spider ring are separated by said spider legs.

3. The spider according to claim 2, wherein said spider further comprises a plurality of mechanical securing means for securing each of said spider legs to said inner spider ring and said outer spider ring, and
   wherein each of said plurality of mechanical securing means is releasable from said spider for separation of said spider legs from said inner spider ring and said outer spider ring.

4. The spider according to claim 1, wherein said upper surface directs a remainder of the at least a portion of the first stream towards said upper curved flow guide and said lower surface directs a remainder of the at least a portion of the second stream towards said lower curved flow guide.

5. The spider according to claim 1, wherein said lower curved flow guide and said upper curved flow guide are rotationally symmetrical.

6. A spider leg for use in a spider in a die head and die tooling, said spider leg comprises:
   an upstream portion;
   a center portion; and
   a downstream portion;
   wherein said upstream portion has a front apex for dividing a stream of plastic in the die head and die tooling into a first stream and a second stream;
   wherein said center portion separates said upstream portion from said downstream portion;
   wherein said downstream portion further comprises an upper leg portion and a lower leg portion staggered at different radial depths from each other, said upper leg portion having an upper curved flow guide and said lower leg portion having a lower curved flow guide;
   wherein said lower curved flow guide directs at least a portion of the first stream towards a vertical plane along a longitudinal axis of spider leg and the upper curved flow guide directs at least a portion of said second stream towards said vertical plane;
   wherein the at least a portion of the first stream and the at least a portion of the second stream are directed towards each other to bond with one another after flowing around said spider leg.

7. The spider leg according to claim 6, wherein said lower leg portion further comprises a lower surface configured to direct a remainder of the at least a portion of the second stream towards said lower curved flow guide, and said upper leg portion further comprises an upper surface configured to direct a remainder of the at least a portion of the first stream towards said upper curved flow guide.

8. The spider leg according to claim 7, wherein said upper surface and said lower surface are flat.

9. The spider leg according to claim 7, wherein said upper curved flow guide further comprises a first upper surface and a second upper surface,
   wherein said first upper surface is curved radially outward from said center portion and said second upper surface is curved radially inwards toward said first upper surface,
   wherein said lower curved flow guide further comprises a first lower surface and a second lower surface, and
   wherein said first lower surface is curved radially outward from said center portion and said second lower surface is curved radially inwards toward said first lower surface.

10. The spider leg according to claim 9, wherein a first junction between said first lower surface and said second lower surface directs the at least a portion of the first stream towards the second stream, and
   wherein a second junction between said first upper surface and said second upper surface directs the at least a portion of the second stream towards the first stream.

11. The spider leg according to claim 6, wherein said upper curved flow guide is configured as an upper ramp sloped radially inwards towards a downstream end of said spider leg, and wherein said lower curved flow guide is configured as a lower ramp sloped radially inwards towards said downstream end of said spider leg.

12. The spider leg according to claim 11, wherein said lower ramp directs the at least a portion of the first stream towards the at least a portion of the second stream, and wherein said upper ramp directs the at least a portion of the second stream towards the at least a portion of the first stream.

13. The spider leg according to claim 6, wherein said upstream portion widens from said front apex to said center portion.

14. The spider leg according to claim 6, wherein said upper curved flow guide and said lower curved flow guide are rotationally symmetrical to each other.

* * * * *